(12) United States Patent
Ma et al.

(10) Patent No.: US 8,555,850 B2
(45) Date of Patent: Oct. 15, 2013

(54) TWO-PIECE COMPRESSION PISTON RING OF AN INTERNAL COMBUSTION ENGINE

(75) Inventors: Zheng Ma, Bloomfield Hills, MI (US); John B. Fisher, Flint, MI (US); Kenneth E. Schroeder, Sanford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 13/198,800

(22) Filed: Aug. 5, 2011

(65) Prior Publication Data

US 2013/0032119 A1 Feb. 7, 2013

(51) Int. Cl.
*F01B 31/00* (2006.01)

(52) U.S. Cl.
USPC .................................... 123/193.6; 277/434

(58) Field of Classification Search
USPC ......... 277/434, 435, 437, 445, 447, 453, 488, 277/489, 496; 123/193.6
See application file for complete search history.

(56) References Cited

U.S. PATENT DOCUMENTS

| | | | | |
|---|---|---|---|---|
| 1,682,850 A * | 9/1928 | Newton | | 277/446 |
| 3,056,607 A * | 10/1962 | Knoebel | | 277/478 |
| 3,174,762 A * | 3/1965 | Hesling et al. | | 277/447 |
| 3,802,711 A * | 4/1974 | McGee | | 277/500 |
| 3,917,290 A * | 11/1975 | Geffroy | | 277/448 |
| 5,072,653 A * | 12/1991 | Parsons | | 92/126 |
| 6,428,014 B2 * | 8/2002 | Scarlett | | 277/435 |
| 7,044,473 B1 * | 5/2006 | Zhu et al. | | 277/459 |
| 7,429,047 B1 * | 9/2008 | Wilkinson | | 277/434 |

* cited by examiner

*Primary Examiner* — M. McMahon
(74) *Attorney, Agent, or Firm* — Quinn Law Group, PLLC

(57) ABSTRACT

A compression ring assembly for a piston of an internal combustion engine includes a first compression ring and a second compression ring, with the second compression ring overlaid adjacent to and in abutting engagement with the first compression ring. When both the first compression ring and the second compression ring are uncompressed and in a free state, the second compression ring includes an outer second ring diameter that is greater than an outer first ring diameter of the first compression ring. Additionally, the first compression ring includes a first radial width that is greater than a second radial width of the second compression ring. A first gap of the first compression ring is positioned relative to a second gap of the second compression ring in a non-overlapping orientation.

18 Claims, 3 Drawing Sheets

TWO-PIECE COMPRESSION PISTON RING OF AN INTERNAL COMBUSTION ENGINE

TECHNICAL FIELD

The invention generally relates to a piston assembly for an internal combustion engine, and more specifically to a ring assembly of the piston assembly.

BACKGROUND

Reciprocating internal combustion engines include an engine block that defines a plurality of bores. A piston assembly is moveably disposed within and supported by each of the bores. The piston assembly includes an annular body having an outer surface that defines at least one groove. A split compression ring defining a ring gap is disposed within each of the grooves.

Prior to installation into the bore, the ring is disposed in an uncompressed condition, i.e., a free state, and includes an uncompressed diameter that is larger than a diameter of the bore. In order to install the piston assembly into the bore, the ring is compressed to define a diameter less than the diameter of the bore. Once installed, the ring expands radially into contact with the bore.

The ring is radially expandable out of the groove and into abutting engagement with the bore. The ring seals against the surface of the bore as the piston assembly reciprocates within the bore. However, oil may still leak past the ring through the ring gap, or at the interface between ring and the bore.

SUMMARY

A piston assembly for an engine of a vehicle is provided. The piston assembly includes an annular body having an outer side surface that defines a groove. A ring assembly is disposed within the groove. The ring assembly includes a first compression ring and a second compression ring. The first compression ring includes a first ring outer face that defines an outer first ring diameter. The second compression ring is overlaid adjacent the first compression ring, and includes a second ring outer face that defines an outer second ring diameter. When both the first compression ring and the second compression ring are disposed in a radially uncompressed condition, the outer second ring diameter is larger than the outer first ring diameter.

A ring assembly for a piston of an internal combustion engine is also provided. The ring assembly includes a first compression ring and a second compression ring. The first compression ring includes a first ring outer face that defines an outer first ring diameter. The second compression ring is overlaid adjacent the first compression ring, and includes a second ring outer face that defines an outer second ring diameter. Both the first compression ring and the second compression ring are configured for disposition within a singular groove defined by an annular body of a piston. When both the first compression ring and the second compression ring are disposed in a radially uncompressed condition, the outer second ring diameter is larger than the outer first ring diameter.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
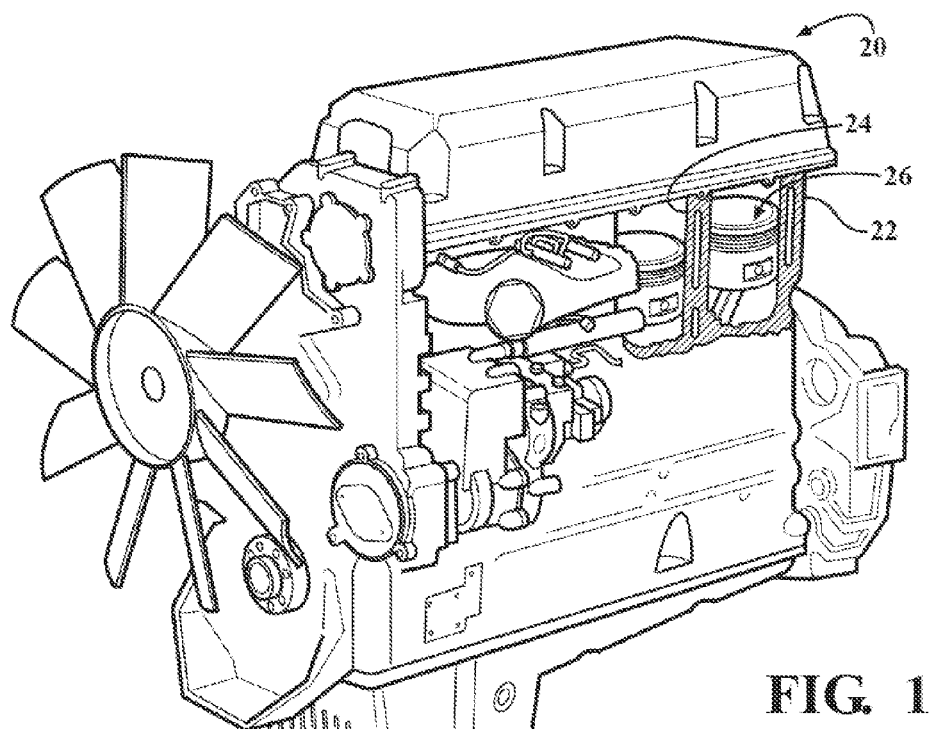
FIG. 1 is a schematic perspective view of an internal combustion engine.

Referring to the Figures, wherein like numerals indicate corresponding parts throughout the several views, an engine is shown generally at 20. Referring to FIG. 1, the engine 20 includes a block 22 defining at least one bore 24, and a piston assembly 26 moveably disposed within each of the bores 24. The engine 20 may include, but is not limited to, an internal combustion engine 20 having 4, 6, 8 or 10 bores 24, with each bore 24 supporting a piston assembly 26 therein. The piston assemblies 26 reciprocate back and forth within the bores 24 during the ignition/exhaust sequences of the engine 20 as is known. The bores 24 may include any diameter suitable for the specific size and/or intended use of the engine 20.

Figure 3:
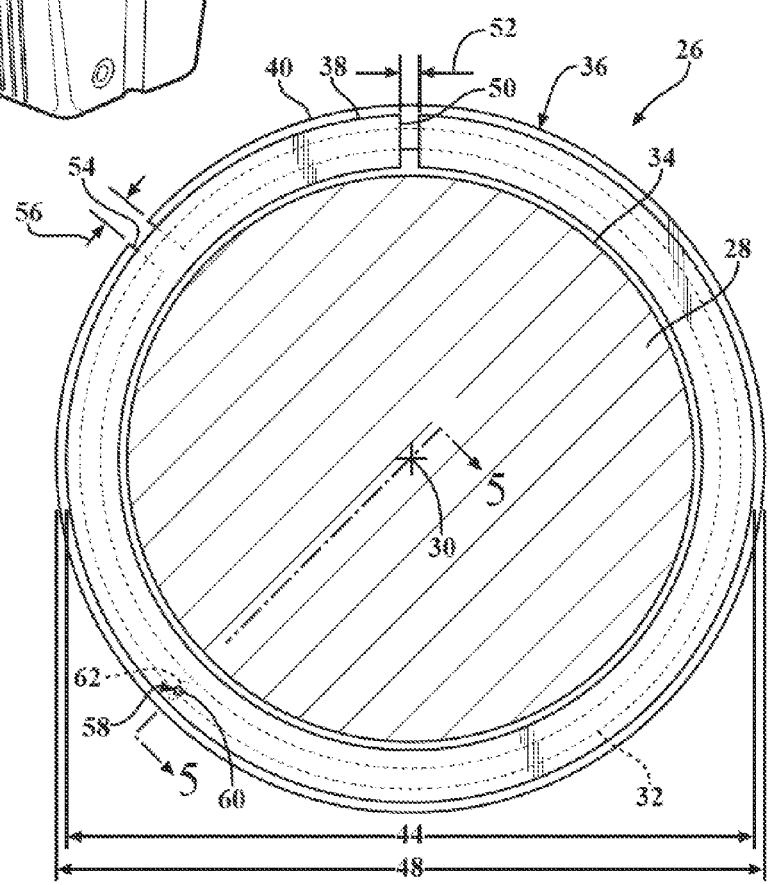
FIG. 3 is a schematic cross sectional view of a piston assembly taken along cut line 3-3 shown in FIG. 2, showing a ring assembly in an uncompressed condition.
Figure 2:
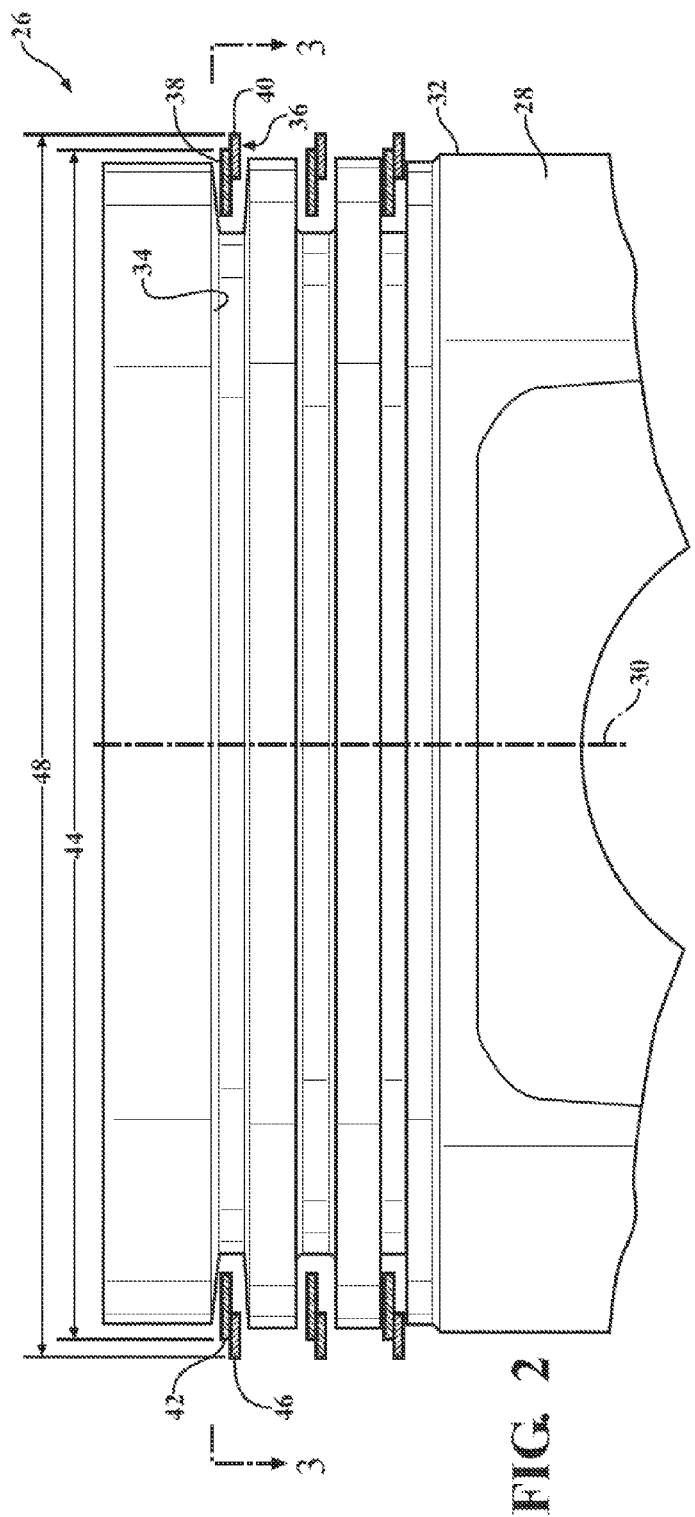
FIG. 2 is a schematic partial cross sectional view of a piston assembly of the engine.
Figure 4:
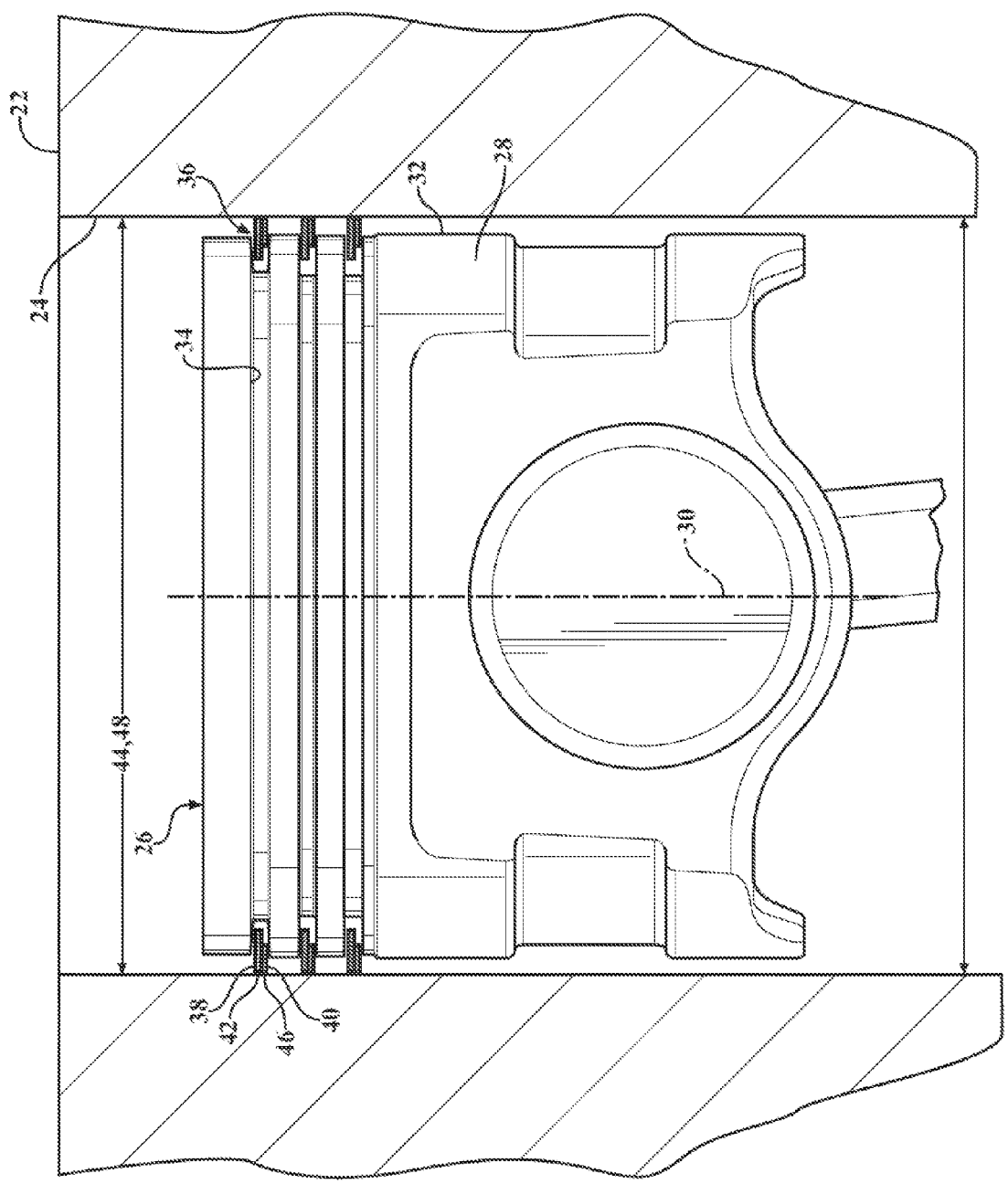
FIG. 4 is a schematic cross sectional view of the piston assembly disposed within a bore of the engine showing the ring assembly in a compressed condition.

Referring to FIGS. 2 through 4, the piston assembly 26 includes an annular body 28 having a center disposed along a longitudinal axis 30. The annular body 28 includes an outer side surface 32 defining at least one groove 34, which is disposed circumferentially about the annular body 28, and concentric with the longitudinal axis 30. Typically, and as shown, the annular body 28 includes three grooves 34 axially spaced from each other along the longitudinal axis 30. However, it should be appreciated that the number of grooves 34 may differ from that shown and described herein.

The piston assembly 26 further includes at least one ring assembly 36, with one ring assembly 36 disposed within each of the grooves 34. Accordingly, it should be appreciated that the piston assembly 26 includes a corresponding number of ring assemblies 36 and grooves 34. As shown in FIGS. 2 and 4, the annular body 28 defines three grooves 34, with a separate ring assembly 36 disposed within each groove 34. However, it should be appreciated that the total number of grooves 34 and ring assemblies 36 may differ from that shown in the Figures and described herein.

The ring assembly 36 includes a first compression ring 38 and a second compression ring 40. The first compression ring 38 and the second compression ring 40 are overlaid adjacent each other in abutting engagement, e.g., one on top of the other. Preferably and as shown, the first compression ring 38 is disposed above the second compression ring 40 as viewed in the Figures. However, the relative positions of the first compression ring 38 and the second compression ring 40 may be reversed. Both the first compression ring 38 and the second compression ring 40 are disposed within a singular groove 34 defined by the annular body 28. Accordingly, it should be appreciated that the groove 34 is sized axially along the longitudinal axis 30 to receive both the first compression ring 38 and the second compression ring 40.

Prior to the piston assembly 26 being installed into the bore 24 of the engine 20, the first compression ring 38 and the second compression ring 40 are disposed in a radially uncompressed condition, i.e., a free state, such as shown in FIG. 2. Once installed into the bore 24, the first compression ring 38 and the second compression ring 40 are disposed in a radially compressed condition, and bias outward away from the annular body 28 and into engagement with a surface of the bore 24 to seal against the bore 24, such as shown in FIG. 4.

The first compression ring 38 includes a first ring outer face 42 that defines an outer first ring diameter 44. The outer first ring diameter 44 is the outer diameter of the first compression ring 38, whether in the compressed condition or the uncompressed condition. Accordingly, the magnitude of the outer first ring diameter 44 changes when the first compression ring 38 expands and/or contracts between the compressed position and the uncompressed position. The second compression ring 40 includes a second ring outer face 46 that defines an outer second ring diameter 48. The outer second ring diameter 48 is the outer diameter of the second compression ring 40, whether in the compressed condition or the uncompressed condition. Accordingly, the magnitude of the outer second ring diameter 48 changes when the second compression ring 40 expands and/or contracts between the compressed position and the uncompressed position.

Referring to FIG. 3, the first compression ring 38 includes a first ring cut 50 that defines a first ring gap 52. The first ring gap 52 extends radially across the first compression ring 38. As such, the first compression ring 38 includes a non-continuous substantially circular shape perpendicular to the longitudinal axis 30. The first ring cut 50 in the first compression ring 38 permits the radial compression of the first compression ring 38 from the uncompressed condition into the compressed condition. Preferably, the first ring gap 52 is between the range of 3.0 mm and 18 mm, depending upon the specific application of the ring assembly, when the first compression ring 38 is in the uncompressed condition.

The second compression ring 40 includes a second ring cut 54 that defines a second ring gap 56. The second ring gap 56 extends radially across the second compression ring 40. As such, the second compression ring 40 includes a non-continuous substantially circular shape perpendicular to the longitudinal axis 30. The second ring cut 54 in the second compression ring 40 permits the radial compression of the second compression ring 40 from the uncompressed condition into the compressed condition. Preferably, the second ring gap 56 is between the range of 3.5 mm and 25 mm, depending upon the specific application of the ring assembly, when the second compression ring 40 is in the uncompressed condition.

When both the first compression ring 38 and the second compression ring 40 are disposed in the radially uncompressed condition, as shown in FIGS. 2 and 3, the second ring gap 56 is equal to or larger than the first ring gap 52, and the outer second ring diameter 48 is equal to or larger than the outer first ring diameter 44. Preferably, the second ring gap 56 is between the range of 0.5 mm and 7.0 mm greater than the first ring gap 52 when both the second compression ring 40 and the first compression ring 38 are disposed in the uncompressed condition. When both the first compression ring 38 and the second compression ring 40 are disposed within the bore 24 in the radially compressed condition, the first ring gap 52 may or may not be equal to the second ring gap 56, and the outer second ring diameter 48 is equal to the outer first ring diameter 44, such as shown in FIG. 4.

The first compression ring 38 includes a radial spring tension related to a width of the first spring gap when the first compression ring 38 is disposed in the radially uncompressed condition. The spring tension of the first compression ring 38 increases with an increase in the width of the first ring gap 52. Similarly, the second compression ring 40 includes a radial spring tension related to a width of the second spring gap when the second compression ring 40 is disposed in the radially uncompressed condition. The spring tension of the second compression ring 40 increases with an increase in the width of the second ring gap 56. Preferably, the second ring gap 56 is larger than the first ring gap 52. However, the second compression ring 40 may or may not include a higher radial spring tension than the first compression ring 38.

Referring to FIG. 3, the first ring gap 52 and the second ring gap 56 are angularly offset relative to each other and about the longitudinal axis 30 in a non-overlapping orientation. Therefore, the first ring gap 52 and the second ring gap 56 are not positioned in direct fluid communication with each other, thereby preventing fluid leakage past the first compression ring 38 and the second compression ring 40 through the first ring gap 52 and the second ring gap 56 respectively.

The ring assembly 36 may include a positioning mechanism 58. The positioning mechanism 58 is configured for securing the non-overlapping orientation between the first ring gap 52 and the second ring gap 56. The positioning mechanism 58 ensures that the first compression ring 38 and the second compression ring 40 do not rotate about the longitudinal axis 30 into a position in which the first ring gap 52 and the second ring gap 56 would overlap with each other. The positioning mechanism 58 may include any mechanism capable of is allowing relative radially movement between the first compression ring 38 and the second compression ring 40, while limiting relative angular movement between the first compression ring 38 and the second compression ring 40. For example, referring to FIG. 5, a pin 60 may be attached to one of the first compression ring 38 and the second compression ring 40, and extend into a radial slot 62 defined by the other of the first compression ring 38 and the second compression ring 40. The interaction between the pin 60 and the radial slot 62 allows the first compression ring 38 and the second compression ring 40 to move radially relative to each other, thereby allowing for expansion and/or contraction between the compressed condition and the uncompressed condition, while limiting relative rotation between the first compression ring 38 and the second compression ring 40 when disposed within the groove 34 of the annular body 28. It should be appreciated that the positioning mechanism 58 shown and described in FIG. 5 is merely exemplary, and that the positioning mechanism 58 may include some other suitable mechanism.

Figure 5:
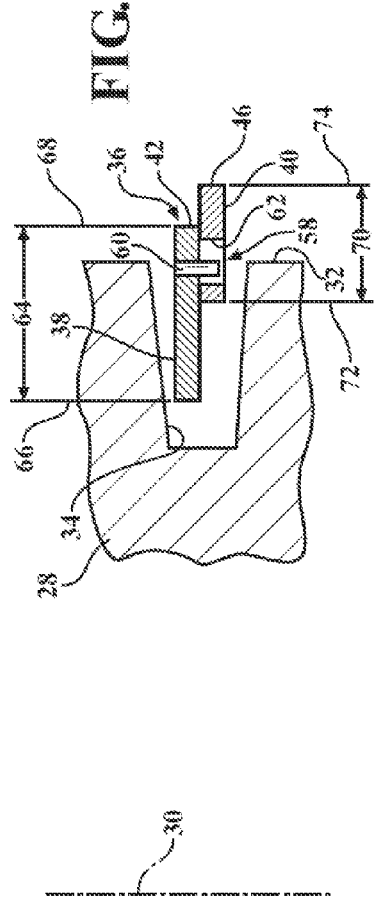
FIG. 5 is a schematic cross sectional view of a positioning mechanism for the ring assembly.

Referring to FIG. 5, the first compression ring 38 defines a first radial width 64. The first radial width 64 is the width of material between an inner radius 66 of the first compression ring 38 and an outer radius 68 of the first compression ring 38 measured perpendicular relative to the longitudinal axis 30. The second compression ring 40 defines a second radial width 70. The second radial width 70 is the width of material between an inner radius 72 of the second compression ring 40 and an outer radius 74 of the second compression ring 40 measured perpendicular relative to the longitudinal axis 30. The first radial width 64 of the first compression ring 38 is equal to or greater than the second radial width 70 of the second compression ring 40. Preferably, the first radial width 64 is at least equal to 0.1 mm greater than the second radial width 70.

The two-piece ring assembly 36, as described above, provides improved performance over the standard single piece compression ring. Because the second ring gap 56 is larger than the first ring gap 52 and the second radial width 70 is smaller than the first radial width 64, the ring conformability of the second compression ring 40 is higher than the ring conformability of the first compression ring 38 to better seal against the surface of the bore 24. The larger first radial width 64 of the first compression ring 38 operates to ensure the ring assembly 36 does not collapse during operation. The larger first radial width 64 of the first compression ring 38, when overlaid onto the second compression ring 40, enlarges the support area on the upper flank of the second compression ring 40 to prevent ring "pop out" during installation of the piston assembly 26 into the bore 24 of the engine 20. Furthermore, because the first compression ring 38 and the second compression ring 40 are disposed adjacent each other, e.g., with the first compression ring 38 disposed on top of the second compression ring 40, with the first ring gap 52 and the second ring gap 56 positioned in the non-overlapping orientation, any gap leakage through the first ring gap 52 and/or the second ring gap 56 is reduced and/or eliminated.

While the best modes for carrying out the invention have been described in detail, those familiar with the art to which this invention relates will recognize various alternative designs and embodiments for practicing the invention within the scope of the appended claims.

The invention claimed is:

1. A piston assembly for an engine of a vehicle, the piston assembly comprising:
    an annular body having an outer side surface defining a groove; and
    a ring assembly disposed within the groove, the ring assembly including:
        a first compression ring including a first ring outer face defining an outer first ring diameter; and
        a second compression ring overlaid adjacent the first compression ring and including a second ring outer face defining an outer second ring diameter;
        wherein the outer second ring diameter is larger than the outer first ring diameter when both the first compression ring and the second compression ring are disposed in a radially uncompressed condition; and
        wherein the first compression ring includes a first ring cut defining a first ring gap extending radially across the first compression ring, and the second compression ring includes a second ring cut defining a second ring gap extending radially across the second compression ring, wherein the second ring gap is larger than the first ring gap when both of the first compression ring and the second compression ring are disposed in the radially uncompressed condition.

2. A piston assembly as set forth in claim 1 wherein the first compression ring includes a radial spring tension related to a width of the first spring gap when the first compression ring is disposed in the radially uncompressed condition, the second compression ring includes a radial spring tension related to a width of the second spring gap when the second compression ring is disposed in the radially uncompressed condition, and wherein the spring tension of the first compression ring and the second compression ring increases with an increase in the width of the first gap and the width of the second gap respectively.

3. A piston assembly as set forth in claim 2 wherein the second compression ring includes a higher radial spring tension than the first compression ring.

4. A piston assembly as set forth in claim 1 wherein the first ring gap is equal to the second ring gap when both the first compression ring and the second compression ring are disposed in the radially compressed condition.

5. A piston assembly as set forth in claim 4 wherein the outer second ring diameter is equal to the outer first ring diameter when both the first compression ring and the second compression ring are disposed in a radially compressed condition.

6. A piston assembly as set forth in claim 1 wherein the first ring gap and the second ring gap are angularly offset relative to each other in a non-overlapping orientation.

7. A piston assembly as set forth in claim 6 wherein the ring assembly includes a positioning mechanism securing the non-overlapping orientation between the first ring gap and the second ring gap.

8. A piston assembly as set forth in claim 7 wherein the positioning mechanism is configured for allowing relative radially movement between the first compression ring and the second compression ring, and is configured for limiting relative angular movement between the first compression ring and the second compression ring.

9. A piston assembly as set forth in claim 1 wherein the first compression ring defines a first radial width, and the second compression ring defines a second radial width, wherein the first radial width is greater than the second radial width.

10. A ring assembly for a piston of an internal combustion engine, the ring assembly comprising;
    a first compression ring including a first ring outer face defining an outer first ring diameter; and
    a second compression ring overlaid adjacent the first compression ring and including a second ring outer face defining an outer second ring diameter;
    wherein both the first compression ring and the second compression ring are configured for disposition within a singular groove defined by an annular body of a piston;
    wherein the outer second ring diameter is larger than the outer first ring diameter when both the first compression ring and the second compression ring are disposed in a radially uncompressed condition; and
    wherein the first compression ring includes a first ring cut defining a first ring gap extending radially across the first compression ring, and the second compression ring includes a second ring cut defining a second ring gap extending radially across the second compression ring, wherein the second ring gap is larger than the first ring gap.

11. A ring assembly as set forth in claim 10 wherein the first compression ring includes a radial spring tension related to a width of the first spring gap when the first compression ring is disposed in the radially uncompressed condition, the second compression ring includes a radial spring tension related to a width of the second spring gap when the second compression ring is disposed in the radially uncompressed condition, and wherein the spring tension of the first compression ring and the second compression ring increases with an increase in the width of the first gap and the width of the second gap respectively.

12. A ring assembly as set forth in claim 11 wherein the second compression ring includes a higher radial spring tension than the first compression ring.

13. A ring assembly as set forth in claim 10 wherein the first ring gap is equal to the second ring gap when both the first compression ring and the second compression ring are disposed in the radially compressed condition.

14. A ring assembly as set forth in claim 13 wherein the outer second ring diameter is equal to the outer first ring diameter when both the first compression ring and the second compression ring are disposed in a radially compressed condition.

15. A ring assembly as set forth in claim 10 wherein the first ring gap and the second ring gap are angularly offset relative to each other in a non-overlapping orientation.

16. A ring assembly as set forth in claim 15 wherein the ring assembly includes a positioning mechanism securing the non-overlapping orientation between the first ring gap and the second ring gap.

17. A ring assembly as set forth in claim 16 wherein the positioning mechanism is configured for allowing relative radially movement between the first compression ring and the second compression ring, and is configured for limiting relative angular movement between the first compression ring and the second compression ring.

18. A ring assembly as set forth in claim 10 wherein the first compression ring defines a first radial width, and the second compression ring defines a second radial width, wherein the first radial width is greater than the second radial width.

* * * * *